(12) United States Patent
Salmisuo et al.

(10) Patent No.: US 7,611,604 B2
(45) Date of Patent: Nov. 3, 2009

(54) METHOD AND DEVICE FOR THE PRODUCTION OF PURIFIED STEAM

(75) Inventors: Mauri Salmisuo, Tuusula (FI); Ilkka Olavi Laitinen, Gammelby (FI)

(73) Assignee: STERIS Europe Inc., Suomen Sivuliike (FI)

( * ) Notice: Subject to any disclaimer, the term of this patent is extended or adjusted under 35 U.S.C. 154(b) by 644 days.

(21) Appl. No.: 10/522,491

(22) PCT Filed: Aug. 28, 2003

(86) PCT No.: PCT/FI03/00630

§ 371 (c)(1),
(2), (4) Date: Oct. 6, 2005

(87) PCT Pub. No.: WO2004/020066

PCT Pub. Date: Mar. 11, 2004

(65) Prior Publication Data

US 2006/0102292 A1    May 18, 2006

(30) Foreign Application Priority Data

Aug. 28, 2002   (FI) .................................. 20021538

(51) Int. Cl.
*B01D 1/06*    (2006.01)
*B01D 1/22*    (2006.01)
*C02F 1/08*    (2006.01)

(52) U.S. Cl. ........................ 159/49; 159/13.2; 159/44; 159/901; 159/27.1; 202/197; 202/236; 202/237; 202/238; 203/10; 203/40; 203/89; 203/DIG. 9

(58) Field of Classification Search ................. 159/6.1, 159/13.2, 27.1, 44, 49, 901; 202/160, 197, 202/236, 237, 238; 203/2, 10, 40, 89, DIG. 9; 95/14, 259; 96/188
See application file for complete search history.

(56) References Cited

U.S. PATENT DOCUMENTS 3,099,607 A * 7/1963 Lustenader et al. ........... 203/10

(Continued)

FOREIGN PATENT DOCUMENTS

CA    2 236 479    5/1997

(Continued)

OTHER PUBLICATIONS

Hemming, Werner, "Verfahrenstechnik," p. 145, Würzburg: Vogel, 1984.

*Primary Examiner*—Virginia Manoharan
(74) *Attorney, Agent, or Firm*—Kusner & Jaffe; Michael A. Centanni

(57) ABSTRACT

The invention relates to a method and a device for the production of pure steam. A falling-film evaporator is used. Of the water-steam mixture leaving the evaporator unit, part of the water is collected at the bottom of the device, and a fraction mainly consisting of steam enters a rising spiral channel for the separation of impurities. In the periphery of the spiral channel apertures are provided for separating impurity-containing droplets, which condense on a surface outside the apertures. The liquid formed is removed from the device. The water phase collected at the bottom enters a recycle line connected to the feed end of the evaporator unit. Feed water is supplied to the recycle line to compensate for pure steam consumption.

8 Claims, 2 Drawing Sheets

U.S. PATENT DOCUMENTS

| | | | |
|---|---|---|---|
| 3,849,259 A | 11/1974 | Steinbruchel | 202/174 |
| 3,875,017 A | 4/1975 | Saari et al. | 202/174 |
| 3,878,054 A | 4/1975 | Rodgers | 203/11 |
| 3,897,314 A | 7/1975 | Liebsch et al. | 203/89 |
| 3,926,739 A | 12/1975 | Izumi | 202/173 |
| 4,018,656 A | 4/1977 | Rogers et al. | 203/11 |
| 4,166,773 A | 9/1979 | Higley et al. | 203/72 |
| 4,167,437 A | 9/1979 | Gilbert | 159/28 |
| 4,330,373 A | 5/1982 | Liu | 202/174 |
| 4,698,138 A * | 10/1987 | Silvey | 203/91 |
| 4,938,868 A * | 7/1990 | Nelson | 203/1 |
| 4,981,555 A | 1/1991 | Hohmann et al. | 159/13.2 |
| 5,259,928 A * | 11/1993 | Ryham | 159/13.1 |
| 5,391,262 A * | 2/1995 | Wilkerson, Jr. | 203/10 |
| 5,409,576 A | 4/1995 | Tleimat | 202/174 |
| 5,853,549 A | 12/1998 | Sephton | 203/2 |
| 5,972,171 A * | 10/1999 | Ross et al. | 203/40 |
| 6,656,327 B2 | 12/2003 | Salmisuo | 203/10 |
| 6,846,387 B1 * | 1/2005 | Zebuhr | 202/172 |
| 6,908,533 B2 * | 6/2005 | Zebuhr | 202/172 |

FOREIGN PATENT DOCUMENTS

| | | |
|---|---|---|
| DE | 19928064 | 12/2000 |
| EP | 0610505 | 8/1994 |
| FI | 79790 | 11/1989 |
| JP | 10328501 | 12/1998 |
| WO | WO02/24299 | 3/2002 |
| WO | WO2004/020066 | 3/2004 |

\* cited by examiner

METHOD AND DEVICE FOR THE PRODUCTION OF PURIFIED STEAM

This application is a National Stage entry of International Application No. PCT/FI03/00630, filed Aug. 28, 2003, the entire specification, claims and drawings of which are incorporated herewith by reference.

FIELD OF THE INVENTION

The invention relates to the production of highly purified steam for special purposes. Particularly, the invention relates to the production of purified steam using a falling-film evaporator and rising channels for separating water droplets and impurities.

BACKGROUND OF THE INVENTION

Highly purified steam is required for various medical purposes, such as production of pharmaceuticals, demanding sterilization applications and production of water for injection. A method and device for production of such steam are disclosed in U.S. Pat. No. 3,875,017. A falling film evaporator as disclosed therein comprises a vertical bundle of evaporation tubes enclosed into a heating jacket, which in turn is enclosed by an outer shell so that an annular space is formed between the heating jacket and the outer shell. Water fed into the evaporating tubes at their upper end flows down the inner surface of the tubes, thereby evaporating and forming steam, which emerges at the lower ends of the tube bundle. The flow of steam makes a 180° turn and flows upwards in the space between the heating jacket and the outer shell. Fins forming a spiral path are attached to the outer surface of the heating jacket, leaving a narrow gap between their edges and the inner surface of the shell. The steam flowing upwards is forced into a spiraling path, whereby water droplets in the evaporation product are driven towards the outer shell by centrifugal force. The droplets adhere to the outer shell wall and form a film of water flowing downwards and finally forming a pool of liquid at the bottom of the device. From there, a stream of water proportional to the amount of purified steam produced is withdrawn as a reject stream. As the water phase in the evaporation product tends to be rich in impurities, these are enriched into the reject stream. From above the spiral path, purified steam is led to the consumption points or to a condenser for producing highly purified water.

In International patent application WO 02/24299, a device of a similar type is disclosed, having apertures in the outer wall of the spiral path. Outside said apertures, a cooled surface is provided. This arrangement creates a pressure gradient across the apertures due to condensation of steam on the cooled surface, causing impurity-containing droplets to migrate through the apertures and collect on the cooled surface. The least pure component of the rising stream in the spiral path thus travels to the periphery and leaves through the apertures, condenses on the cooled surface and forms a water phase rich in impurities, which flows down and mixes with a pool of liquid at the bottom of the device below the zone where the steam makes its 180° turn referred to above. From this pool, a reject stream is withdrawn.

DISCLOSURE OF THE INVENTION

According to the present invention, a further improvement in the above-described method for providing purified steam and the corresponding generators of purified steam is provided. The evaporation product emerges from the evaporation pipes as a mixture of steam and water, as there must be a water phase to collect the impurities. The impurities are enriched in the water droplets centrifugally separated in the spiraling upwards path. According to the method of the present invention, defined in claim 1, the liquid phase of the evaporation product collecting at the bottom of the device is at least partly recirculated to the feed line, forming a recirculation system. In contrast, the water phase forming on the surface outside the periphery of the spiral path is separated from the volume of liquid forming at the bottom of the device. Preferably, the said water phase is removed as a reject stream in its entirety.

The feed water intake may be connected to the recirculation system, and feed water intake is controlled by the amount of purified steam withdrawn from the generator. Thus, the recirculation circuit and the whole system can be adapted to the factual steam consumption.

According to a further embodiment of the invention, a further reject stream is withdrawn from the recirculation circuit prior to the feed inlet. This makes possible the use of a lower purity grade of feed water.

Preferably, the surface outside the periphery of the spiral path is temperature controlled in order to control the condensation of steam thereon. Normally this means cooling.

Another object of the invention is to provide a generator for purified steam according to claim 5, for implementing the method set forth in claim 1.

BRIEF DESCRIPTION OF THE DRAWINGS

The invention is disclosed in detail below, with reference to the attached drawings, in which.

DETAILED DESCRIPTION

Figure 1:
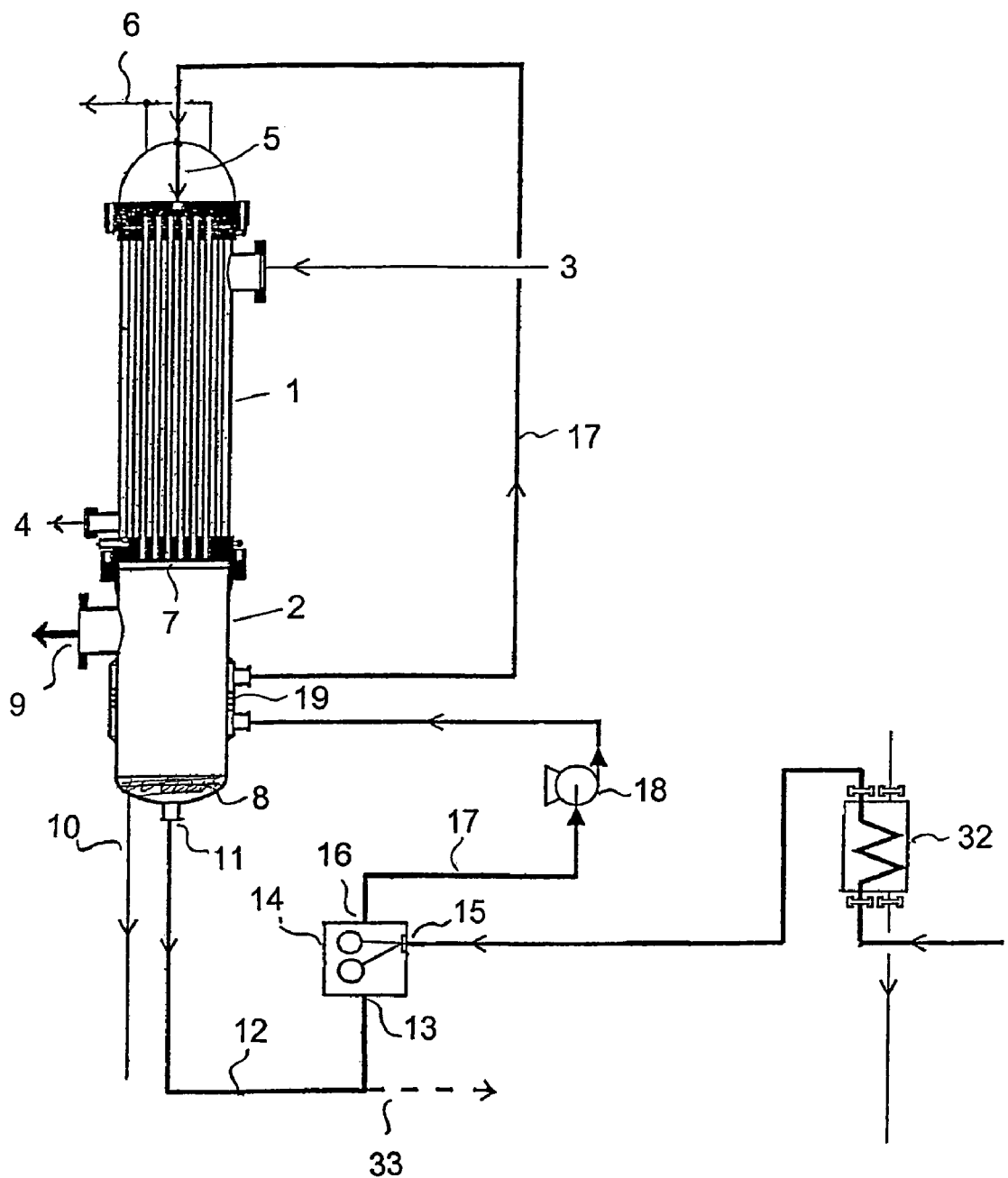
FIG. 1 shows a schematic drawing of a steam production plant according to the present invention and FIG. 2 shows a section of the separation device of a steam production plant according to the present invention.

FIG. 1 shows a steam production device comprising evaporation tube unit 1 and separation unit 2. Water enters through feed spray nozzle 5 at the top of falling film-evaporation tube unit 1, the jacket of which is heated by industrial steam or another suitable heating medium, entering at connection 3 and leaving at connection 4.

Atmospheric and other gases dissolved in the feed may be withdrawn at connections 6 as they separate from the feed stream. The evaporation product leaves the lower end 7 of the evaporation tubes as a mixture of water and steam, whereby relatively large drops of water fall down to form a volume of liquid 8 at the bottom of the separation unit. The remainder of the evaporation product, consisting of steam and minute droplets, makes a 180° turn and enters a spiral channel (not shown in FIG. 1) in an upward spiraling motion. Impurities are separated in the manner described more closely in connection with FIG. 2. The purified steam is withdrawn from the device at outlet 9.

A separated water phase rich in impurities exits the device as a reject stream through pipe 10.

The liquid phase 8 collected at the bottom of the separation unit 2 leaves the separation unit at connection 11.

In the embodiment shown, the circulating water is carried through pipe 12 to the circuit inlet 13 of a feed controller 14. The feed controller further has a feed water inlet 15 and a circuit outlet 16. Pipe 17 carries circulating liquid through pump 18 and temperature control jacket 19 back to the feed inlet of evaporation tube unit 1. The feed water can be preheated in heat exchanger 32.

The feed controller with the feed water inlet can also be located elsewhere in the circuit relative to pump 18 and temperature control jacket 19. For example, if the feed water enters shortly before jacket 19, the temperature in the jacket is easily controlled. The jacket need not be part of the recirculation circuit, but can be independently operated. A further reject stream may be withdrawn from the recirculation circuit, for example as shown at 33.

This makes possible the use of a less pure feed water stream. Commonly, the feed water from this type of pure steam generator has been purified by reverse osmosis or a corresponding method producing a high grade of purified water. Such prepurification adds significantly to the total cost of the pure steam production. If less pure water can be used, to the cost of a larger water consumption per unit generated pure steam, the overall economy may be favorable.

Figure 2:
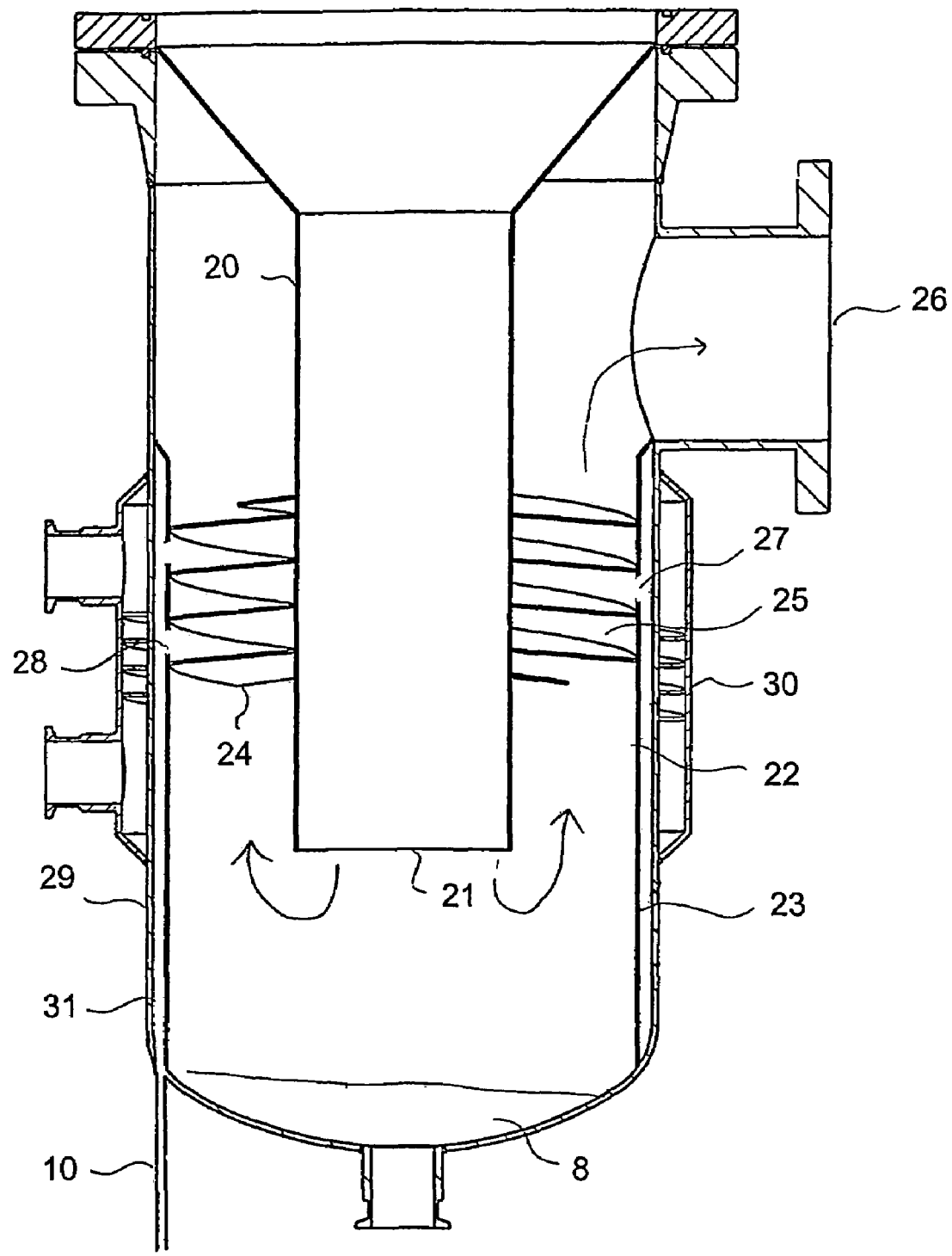

FIG. 2 shows a section of a separation device according to the present invention. The evaporation product enters downpipe 20. In the embodiment shown, the upper end of the downpipe is shaped as a funnel in order to maintain the same outer diameter in the separator as in the evaporator. The evaporation product emerges from the lower end 21 of the downpipe, the water phase separates to join the liquid pool 8 on the bottom of the device, and the steam phase turns 180° to enter the annular rising channel 22 between the downpipe and intermediate shell 23. Spiral fins 24 form a spiral path 25 for the evaporation product.

The spiral movement of the evaporation product causes centrifugal force which forces water droplets in the product to the periphery of path 25. Foreign matter present in the evaporation product may act as nuclei for condensation, and this phenomenon thus enhances the transport of this matter to the periphery of the spiral path. Purified, dry steam leaves spiral path 25 and exits the device at connection 26.

The upper part of the inner shell has means for allowing steam to pass to the outer shell. In the embodiment shown, at least one opening 27 is provided in the inner shell 23 to allow droplets to enter space 28 between the inner shell 23 and outer shell 29. Further, in this embodiment, outer shell 29 is provided with a temperature control jacket 30. As this jacket is used to cool the inner surface of shell 29, steam in space 28 condenses on said inner surface and form a descending water film. The condensation ensures, that no backflow occurs into spiral path 25 through openings 27. A suitable number of openings 27 of an appropriate shape may be provided. Droplets and impurities driven to the inner wall of shell 23 by centrifugal force pass through the openings, and are carried to the cooled inner wall of outer shell 29 by the radial outward stream caused by condensation of steam.

The openings may be designed as vertical slits in the outer periphery of the spiral path, i.e. in shell 23. The use of one or more slits running in parallel to the spiral fins is also possible, as well as circular, oval or other shapes of openings, possibly arranged with edges enhancing the capture of droplets in circular motion along the spiral path. Shell 23 may also be absent in the section surrounding the spiral path.

The impurity-enriched liquid phase flows down the inner surface of shell 29 and is collected in the space 31 at the bottom of the jacket formed by outer shell 29 and inner shell 23. From there, the reject stream leaves through pipe 10.

At the bottom of the separation unit, a volume 8 of liquid is maintained, supplied from the water phase of the evaporation product leaving the evaporation tubes. This liquid is recirculated as described above. As those skilled in the art may contemplate, designs of the separation unit bottom differing from that shown are possible for keeping the liquid volume 8 and the reject phase separated.

An apparatus according to the present invention provides several advantages relative to devices of similar type according to the prior art. In prior art devices, the amount of rejected water is larger, and the economy accordingly less favorable. The recirculated liquid makes several passes through the dissolved-gas removal. As liquid continuously circulates, the heat-exchange surfaces are continuously wetted and the accumulation of impurities on said surfaces is avoided. The complete heat exchange area is also constantly available during operation. Heat is stored in the circulating liquid, and the device can respond rapidly to a change in consumption. The recirculating principle allows a dynamic steady state in a situation where there is no purified steam consumption, which was not previously possible in falling film evaporators. Preferably, the pump capacity is dimensioned to maintain the recirculation flow at at least twice the mass flow of purified product steam at maximum output.

Further, the apparatus can be kept continuously at a high temperature, maintaining sterility in the entire circuit.

The invention claimed is:

1. A method for producing purified steam using a falling film evaporation tube unit, the method comprising the steps of:
    a) introducing a feed stream of water to a falling film evaporation tube unit to produce a steam and a liquid;
    b) collecting the liquid below a lower end of the falling film evaporation tube unit to form a volume of liquid;
    c) circulating the steam upward in a spiraling rotational path;
    d) separating droplets from the steam to form a first reject stream;
    e) combining a portion of the volume of liquid with the feed stream to form a circulating liquid; and
    f) removing a second reject stream from the circulating liquid.

2. A method according to claim 1, wherein the droplets are separated by means of a temperature controlled surface.

3. A method according to claim 1, wherein dissolved gases are continuously removed from the circulating liquid.

4. A method according to claim 1, wherein a mass flow of the circulating liquid is at least twice a maximum product steam output.

5. A device for producing purified steam, the device comprised of:
    a falling film evaporation tube unit;
    a separating unit for separating a steam and a liquid, the separating unit comprised of:
        a central downpipe for receiving an evaporation product from the falling film evaporation tube unit,
        an inner shell,
        an outer shell, wherein the inner shell provides for passage of a steam to the outer shell, and
        a set of fins forming a spiral path surrounding the central downpipe;
    a first exit tube connected to a bottom of a space between the inner shell and the outer shell, the first exit tube for flowing a reject stream from the space;
    a second exit tube connected to a space inside the inner shell, the second exit tube fluidly connected to the liquid in the inner shell;
    a recirculation tubing fluidly connecting the second exit tube to an inlet of the falling film evaporation tube unit; and
    a tube fluidly connected to the recirculation tubing for removing a reject stream therefrom.

6. A device according to claim 5, comprising temperature control means fitted to the outer shell.

7. A device according to claim 5, comprising means for withdrawing a stream from the inlet end of the falling film evaporator.

8. A device according to claim 5, comprising a pump in the recirculation tubing having a mass flow capacity of at least twice a maximum product steam output of the device.

* * * * *

UNITED STATES PATENT AND TRADEMARK OFFICE
CERTIFICATE OF CORRECTION

| | |
|---|---|
| PATENT NO. | : 7,611,604 B2 |
| APPLICATION NO. | : 10/522491 |
| DATED | : November 3, 2009 |
| INVENTOR(S) | : Salmisuo et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 987 days.

Signed and Sealed this

Twelfth Day of October, 2010

David J. Kappos
*Director of the United States Patent and Trademark Office*